United States Patent Office 2,829,065
Patented Apr. 1, 1958

2,829,065

SYNTHETIC DRYING OILS BY COPOLYMERIZATION OF DIOLEFINS WITH MYRCENE

Anthony H. Gleason and Joseph F. Nelson, Westfield, N. J., assignors to Esso Research and Engineering Company, a corporation of Delaware No Drawing. Application October 26, 1954
Serial No. 464,883

7 Claims. (Cl. 106—285)

This invention relates to a new synthetic drying oil and more particularly relates to the preparation of a drying oil by the copolymerization of conjugated diolefins with myrcene.

It is known to prepare liquid hydrocarbon drying oils by polymerizing conjugated diolefins such as butadiene-1,3 with finely divided alkali metal in the presence of a diluent. It is also known to copolymerize the diolefin with a vinyl aromatic, such as styrene. Such copolymerizates are particularly useful in coatings, films and the like and particularly for use in baked enamels where flexible films are obtained which are remarkably resistant to water, caustic, grease and the like.

It has now been found that a drying oil having film-forming characteristics equally as good as those obtained from butadiene and styrene can be obtained by copolymerizing a conjugated diolefin with myrcene.

According to this invention, therefore, 60 to 95 parts of butadiene and 40 to 5 parts of myrcene, preferably about 75 to 85 parts of the former with 25 to 15 parts of the latter, are copolymerized either by batch or continuous process in the presence of alkali metal catalysts, such as sodium, potassium and the like. The polymerization is carried out in a reaction diluent at temperatures ranging from about 25° C. to 95° C., preferably temperatures between 45° C. and 90° C. when a batch process is used, and at 55° to 105° C., preferably 60° C. to 95° C. when operating a continuous process in which it is desired to go to essentially 100% conversion. As a polymerization catalyst about 1.0 to 5 parts of finely divided sodium per 100 parts of monomers is used. The quantity of catalyst is dependent on the state of subdivision and on the purity of the feed. In a closed system which has been in use for some time, the quantity of catalyst required can be quite low due to the system becoming well cleaned out and the lack of exposure to air.

The replacement of myrcene by other terpenes and polyolefins, such as dipentene, alpha-terpinene, alloocimene and hexatriene, beta pinene and the corresponding alkyl substituted homologues, results either in no copolymerization or in the production of undesirable cross-linked products.

Materials used as diluents in the polymerization should be liquid at the polymerization temperature; that is, they should boil between about 20 and 250° C., although more volatile materials boiling as low as —15° C. may be used also, providing that the polymerization pressure is increased correspondingly. Preferred diluents are essentially aliphatic hydrocarbons such as naphtha (boiling range about 90 to 120° C.) or straight run mineral spirits such as Varsol (boiling range about 150 to 200° C.), but butane, pentane, benzene, toluene, xylene, cyclohexane or similar inert hydrocarbons are also useful, individually or in admixture with each other. In general, the aromatic solvents are not so desirable as the aliphatic ones because of the toxicity of the former. The hydrocarbon diluents are used in amounts ranging from 50 to 500, preferably 200 to 300 parts per 100 parts of monomers.

Another important feature of the present invention involves the elimination of color, which was heretofore characteristic of butadiene polymers made with a sodium catalyst, and also an improvement in polymerization rate. In particular, it has now been discovered that these objections can be overcome to a varying degree by using along with the aforementioned hydrocarbon diluent, a substantial amount a $C_4$ to $C_8$ aliphatic ether co-diluent or of cyclic ethers other than those having an —O—C—O— grouping. A particularly outstanding promoter has been found in dioxane-1,4, whose presence in the feed brings about the production of a colorless product of desirable viscosity and promotes the reaction sufficiently to give substantially 100% conversion at 50° C. in a period of about 6 to 12 hours. Similarly, favorable results are also obtained with diethyl ether $(C_2H_5)_2O$, as well as with methylal, ethylal, methyl acetal, diisopropyl ether, and t-butyl methyl ether. In a batch process diethyl ether is not too desirable since with it the initial induction period tends at times to be rather long and when the reaction starts, it goes so rapidly as to be difficult to control. However, in a continuous process where the induction period is not a problem diethyl ether is to be preferred, since its highly activating property makes it possible to go to high conversion such as 90 to 100%.

Other ethers useful to a still lesser extent are vinyl ethyl ether, vinyl isobutyl ether, dihydropyrane, and phenetole, all of which have a favorable effect on the absence of color in the product. However, in contrast to the preferred ethers named earlier herein, the four ethers just named do not promote the reaction rate and dihydropyrane as well as phenetole actually have a retarding effect on the polymerization rate. Conversely, dimethyl ether, dibutyl ether and tetrahydrofuran have been found to act as effective promoters for the polymerization rate, but the resulting product is colored. The above indicates that the preferred ethers, such as p-dioxane or diethyl ether and its ethylene glycol homologues, have a dual action as reaction promoters as well as polymer modifiers. In contrast, the other described ethers have only one or the other effect, and are therefore useful only where either colorless products are not required or where there is no need for promoting the reaction rate. Finally, all ethers having an —O—C—O— group in a ring structure, such as dioxane-1,3, dioxolane, paraldehyde and glycol ethylidene diacetal, inhibit the polymerization rate so excessively that their use is impractical. The same is true of furan, an unsaturated cyclic mono ether. Dimethyl ether also does not serve the desired purpose, since as stated previously a colored product results when it is used. From the foregoing, it is apparent that the preferred promoter-modifiers are cyclic diethers of 4 to 8 carbon atoms wherein the two oxygens are separated by at least two carbon atoms, and also aliphatic ethers such as diethyl ether, tert.-butyl methyl ether, and diisopropyl ether, as well as compounds of the acetal type.

The ether co-diluent is used in amounts ranging from about 10 to 300 parts, preferably 10 to 100 parts per 100 parts of monomers. In selecting the ether co-diluent it is especially desirable to select an ether having a boiling point at least 10° C. below the lower limit of the boiling range of the hydrocarbon diluent and thus, when using Varsol, ether co-diluents boiling between about 25 and 140° C. are preferred for the reason that their separation from the polymerized reaction mixture is greatly facilitated by virtue of the stated difference in boiling points. When the ether and the hydrocarbon diluent are both recycled to the reactor, their boiling points or ranges may overlap, since they need not be separated.

It is also highly advantageous to use about 1 to 50%, preferably 10 to 20 weight percent (based on sodium) of an aliphatic alcohol, those of 3 to 8 carbon atoms being preferred. Isopropanol, isobutanol, isopentanol, secondary butanol, n-butanol, and tert.-butanol are typical of suitable alcohols. Such alcohols have been found to act as catalyst promotors. The coarser the catalyst dispersion, the more essential it is to have a sufficient amount of alcohol promotor present.

The reaction time and induction period vary depending on the degree of catalyst dispersion, reaction temperature, and purity of feed materials. The usual reaction time in the batch process ranges from about 40 hours at 50° C. with a coarse catalyst to about 15 minutes at 95° C. with a catalyst having a particle size of less than 100 microns in diameter. It is preferred to operate with a catalyst particle size of about 1 to 100 microns, preferably about 10 to 50 microns. Such a catalyst can be prepared by dispersing the molten alkali metal in a hydrocarbon such as Varsol by means of a homogenizer such as an Eppenbach Homo-Mixer and cooling the resulting dispersion below the melting point of sodium to prevent coalescence of the dispersed sodium particles.

The catalyst is usually fed to the reactor as a slurry of metal particles dispersed in a hydrocarbon solvent. Agitation of the reaction mixture during synthesis increases the efficiency of the catalyst. Conversions of 50 to 100% on monomers can be accomplished fairly readily in batch-type as well as in continuous operations. In continuous polymerizations it is desirable to use a multiple stage system in order to go to high conversions without unduly lowering the molecular weight of the product.

Destruction of catalyst at the end of the reaction is effectively accomplished by adding to the reaction mixture a moderate excess of an anhydrous or aqueous $C_1$ to $C_5$ fatty acid which is desirably soluble to some extent in the hydrocarbon mixture, e. g. formic, acetic and pentanoic acid. After destruction of the catalyst the crude polymerization product containing the salts, excess acid and other impurities is neutralized with ammonia, and the neutralized product is finally filtered with a filter aid such as silica gel, clay, charcoal or its equivalent to free it of salts and their hydrates.

The clear colorless filtrate is then fractionally distilled to remove the alcohol, the ether and low boiling hydrocarbons. Since the resulting polymer solution is usually too dilute in the case of high boiling diluents for most practical uses, it is advantageous to distill off additional hydrocarbon until a product containing not less than about 50% to 70% non-volatile matter is obtained, the non-volatile matter being the polymeric drying oil. Where even more highly concentrated products are desired it is possible to raise the concentration of the polymeric oil to as much as 99 to 100% non-volatile matter by still more extensive distillation or stripping; the use of a stripping gas such as methane or steam is advantageous where highly concentrated drying oils are desired. Alternatively, a low boiling diluent such as butane or pentane may be used in the synthesis step and thus simplify the eventual removal of the diluent from the polymeric product.

The reaction is preferably carried out in an agitated closed single reactor if a batch process is employed. In a continuous process it is necessary to carry out the process in two or more stages, when carrying the reaction to essentially 100% conversion. At lower conversions a one-stage continuous process is satisfactory.

The resulting product, being usually a solution of polymeric drying oil in a suitable hydrocarbon solvent such as solvent naphtha or mineral spirits, is, depending on the amount and type of ether used, a clear, colorless to light yellow varnish composition having a viscosity of 0.15 to 10 poises at about 50% non-volatile matter content, preferably 0.25 to 6 poises. The viscosity usually falls in the range of 0.15 to 2 poises when a continuous process is used. If desired, the product viscosity can be readily increased within or above the 0.15 to 6 poise limit by heat bodying the oil in the absence of air at temperatures between 200 and 300° C., e. g. at 220 to 260° C., as described in U. S. Patent 2,672,425, issued March 16, 1954. The clear varnish compositions can be brushed, poured or sprayed to give durable clear films on drying in air or baking, especially when conventional driers such as the naphthenates or octoates of cobalt, lead, or manganese are added thereto.

Furthermore, where the drying oil compositions of the present invention are intended for use in pigmented enamels, their gloss and wetting power can be further improved by reacting them with a small amount of a polar compound such as maleic anhydride, acrylonitrile, thioglycollic acid or other equivalent materials described in U. S. Patent 2,652,342, issued September 15, 1953, and Serial No. 106,487, filed July 23, 1949, now U. S. Patent 2,683,162.

The invention will be better understood from the subsequent illustrative examples. In these examples, as in all other portions of this specification, when quantities are stated in "parts," it will be understood that reference is had thereby to parts by weight, unless expressly indicated otherwise.

*Example I*

Freshly distilled commercial myrcene containing about 25% of impurities consisting of limonene and beta-pinene and 75% myrcene was copolymerized at 50° C. with butadiene-1,3 according to the following recipe:

| | |
|---|---|
| Butadiene _____parts__ | 80 |
| Myrcene (100% basis) _____do____ | 20 |
| Dioxane-1,4 _____do____ | 30 |
| Mineral spirits (Varsol) _____do____ | 200 |
| Isopropanol _____do____ | 0.3 |
| Sodium (based on monomers) _____percent__ | 2 |

After 24 hours a conversion of 95% was obtained indicating that approximately 75% of the crude myrcene used in the recipe had reacted. The copolymer product, when purified and stripped to 50% N. V. M. as described above, was substantially colorless and had a viscosity of 0.8 poise. Air-dried films containing 0.4% lead and 0.04% manganese naphthenates became set-to-touch in six hours and possessed good chemical resistance, e. g. to soap and caustic. Baked films (30′ at 300° F.) were characterized by superior chemical resistance and flexibility.

*Example II*

The experiment of Example I was repeated using the following recipe:

| | Parts |
|---|---|
| Butadiene _____ | 70 |
| Myrcene (100% basis)_____ | 30 |
| Naphtha _____ | 300 |
| Dioxane-1,4 _____ | 30 |
| Isopropanol _____ | 0.3 |
| Sodium _____ | 2 |

After 24 hours a conversion of 90% was obtained. The viscosity of the copolymer was 0.7 poise at 50% N. V. M.; the iodine number was 419 cg./g.

This product was heat-bodied for 4 hours at 250° C. giving a product having a viscosity of 2.1 poise at 50% N. V. M. and an iodine number of 375 cg./g. (a 10.5% decrease as compared with polymer before heat bodying). When combined with driers the heat-bodied copolymer formed air-dried and baked films of excellent quality, the baked films being especially good in flexibility.

*Example III*

As another example, an additional run was made using 90 parts of butadiene and 10 parts of myrcene (100% basis), other ingredients of the recipe and the operating conditions being essentially the same as in Example I. The resulting copolymer product was substantially colorless and when compounded with suitable driers gave air-dried and baked films of high quality.

*Example IV*

Attempts were made to substitute alpha terpinene, dipentene and beta-pinene for the myrcene in the recipe of Example I but the results indicated that little or none of these compounds reacted with butadiene. Twenty parts of allo-ocimene in the place of myrcene in Example I gave a low conversion of copolymer which was partially gelled.

It can be seen from the foregoing that a novel composition comprising a viscous oily butadiene-myrcene copolymer of outstanding utility in the protective coating art can be prepared by means of a novel polymerization process. The novel composition is characterized by its clarity, lack of discoloration, excellent drying rate and good chemical resistance of air-dried and baked films prepared therefrom.

The nature of the present invention having been thus fully set forth and specific examples of the same given, what is claimed as new and useful and desired to be secured by Letters Patent is:

1. A new composition of matter comprising a siccative copolymer of about 60 to 95 parts of a combined conjugated diolefin and about 40 to 5 parts of combined myrcene, said copolymer having a viscosity of about 0.15 to 10 poises at 50% N. V. M. in a hydrocarbon solvent.

2. A new drying oil composition comprising a hydrocarbon solvent and, dissolved therein, a siccative copolymer of 60 to 95 parts of combined butadiene-1,3 and 40 to 5 parts of combined myrcene, said copolymer being substantially colorless and having a viscosity of about 0.15 to 10 poises at 50% N. V. M.

3. A polymerization process which comprises mixing 60 to 95 parts of a conjugated diolefin and 40 to 5 parts of myrcene, 50 to 500 parts of an inert hydrocarbon diluent boiling between −15° C. and 250° C., 10 to 50 parts of a promoter selected from the group consisting of open-chain ethers having 4 to 8 carbon atoms and cyclic di-ethers having 4 to 8 carbon atoms wherein the two oxygen atoms are separated by at least two carbon atoms, and 1.0 to 5 parts of a finely divided alkali metal, and maintaining the resulting mixture at a temperature between 25 and 105° C. until substantially 100% conversion is obtained.

4. A process according to claim 3 wherein the reaction mixture also contains 1 to 35 percent based on weight of catalyst of an aliphatic alcohol having 3 to 8 carbon atoms.

5. Process according to claim 4 in which the catalyst is sodium.

6. Process according to claim 5 in which the ether is dioxane-1,4.

7. Process according to claim 5 in which the ether is diethyl ether.

References Cited in the file of this patent

UNITED STATES PATENTS

| | | |
|---|---|---|
| 2,487,898 | Rummelsburg | Nov. 15, 1949 |
| 2,586,594 | Arundale et al. | Feb. 19, 1952 |
| 2,672,425 | Gleason et al. | Mar. 16, 1954 |

OTHER REFERENCES

"The Terpenes," Simonsen, page 16, vol. 1, 2nd ed. (1947), University Press, Cambridge, Mass.